(12) United States Patent
Swab

(10) Patent No.: US 11,707,962 B2
(45) Date of Patent: Jul. 25, 2023

(54) TRAILER TRANSPORT REFRIGERATION UNIT ASSISTED BY A TRACTOR AUXILIARY POWER UNIT

(71) Applicant: Carrier Corporation, Palm Beach Gardens, FL (US)

(72) Inventor: Michael Thomas Swab, Acworth, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 564 days.

(21) Appl. No.: 16/644,108

(22) PCT Filed: Sep. 7, 2018

(86) PCT No.: PCT/US2018/049942
§ 371 (c)(1),
(2) Date: Mar. 3, 2020

(87) PCT Pub. No.: WO2019/051219
PCT Pub. Date: Mar. 14, 2019

(65) Prior Publication Data
US 2021/0061156 A1    Mar. 4, 2021

Related U.S. Application Data

(60) Provisional application No. 62/556,626, filed on Sep. 11, 2017.

(51) Int. Cl.
*B60H 1/00*    (2006.01)
*B60H 1/32*    (2006.01)
(Continued)

(52) U.S. Cl.
CPC ........... *B60H 1/00014* (2013.01); *B60D 1/62* (2013.01); *B60H 1/3232* (2013.01); *B60P 3/20* (2013.01);
(Continued)

(58) Field of Classification Search
None
See application file for complete search history.

(56) References Cited

U.S. PATENT DOCUMENTS 4,100,755 A * 7/1978 Leonard .................. F25B 33/00
                                                        62/476
5,265,435 A * 11/1993 Richardson .......... B60H 1/3222
                                                        62/133
(Continued)

FOREIGN PATENT DOCUMENTS

DE    102011105475 A1 * 12/2012 ............. B65D 88/74
DE    102013104507 A1 * 11/2013 ............... B60K 6/26
(Continued)

OTHER PUBLICATIONS

International Search Report for International Application No. PCT/US2018/049942; Date of Completion: Dec. 14, 2018; dated Jan. 3, 2019; 2 Pages.

(Continued)

*Primary Examiner* — Fekadeselassie Girma
(74) *Attorney, Agent, or Firm* — Cantor Colburn LLP

(57) ABSTRACT

A tractor trailer system includes a tractor and a trailer. The tractor includes a hotel device and an Auxiliary Power Unit (APU) configured to provide electrical power to the hotel device. The trailer is connected to the tractor, and includes a Transport Refrigeration Unit (TRU) having a TRU controller, an electrical TRU component, and a TRU Power Unit. The TRU controller is configured to utilize the APU to provide electrical power to the electrical TRU component during low TRU load conditions, and utilize the TRU Power Unit during high TRU load conditions.

12 Claims, 4 Drawing Sheets

(51) Int. Cl.
| | |
|---|---|
| *B60D 1/62* | (2006.01) |
| *B60P 3/20* | (2006.01) |
| *B60P 3/38* | (2006.01) |
| *B60R 16/023* | (2006.01) |
| *B60R 16/03* | (2006.01) |
| *B62D 33/06* | (2006.01) |
| *F02B 63/04* | (2006.01) |
| *F02N 11/08* | (2006.01) |
| *F25D 11/00* | (2006.01) |

(52) U.S. Cl.
CPC ............ *B60P 3/38* (2013.01); *B60R 16/0231* (2013.01); *B60R 16/03* (2013.01); *B62D 33/0612* (2013.01); *F02B 63/042* (2013.01); *F02N 11/0862* (2013.01); *F25D 11/003* (2013.01)

(56) References Cited

U.S. PATENT DOCUMENTS

| | | | |
|---|---|---|---|
| 5,333,678 A | 8/1994 | Mellum et al. | |
| 7,049,707 B2 | 5/2006 | Wurtele | |
| 7,290,400 B2 | 11/2007 | Heberle et al. | |
| 7,614,242 B1 * | 11/2009 | Quesada Saborio | F25D 11/003 62/298 |
| 8,118,005 B2 | 2/2012 | Bradley et al. | |
| 8,295,950 B1 | 10/2012 | Wordsworth et al. | |
| 8,720,215 B2 | 5/2014 | Magri et al. | |
| 9,045,018 B2 | 6/2015 | Swanson | |
| 9,085,218 B2 | 7/2015 | Awwad | |
| 9,126,544 B2 | 9/2015 | Larson et al. | |
| 9,464,839 B2 | 10/2016 | Rusignuolo et al. | |
| 9,562,715 B2 | 2/2017 | Kandasamy | |
| 2008/0023965 A1 | 1/2008 | Cagliari et al. | |
| 2011/0030399 A1 * | 2/2011 | Lifson | F25B 27/00 62/236 |
| 2012/0191252 A1 * | 7/2012 | Rockenfeller | F25B 27/005 307/65 |
| 2013/0144442 A1 | 6/2013 | Dudley et al. | |
| 2013/0231808 A1 * | 9/2013 | Flath | B60W 20/10 903/903 |
| 2014/0137590 A1 | 5/2014 | Chopko | |
| 2014/0283533 A1 | 9/2014 | Kurtzman et al. | |
| 2015/0184912 A1 | 7/2015 | Nelson et al. | |
| 2017/0248359 A1 * | 8/2017 | Koppineedi | F25D 17/02 |
| 2017/0282714 A1 * | 10/2017 | Schumacher | B60H 1/00428 |
| 2019/0061473 A1 * | 2/2019 | Dykes | B60H 1/3208 |
| 2021/0061156 A1 * | 3/2021 | Swab | B60P 3/20 |

FOREIGN PATENT DOCUMENTS

| | | | | |
|---|---|---|---|---|
| EP | 1912327 A2 * | 4/2008 | ........... | B60H 1/3222 |
| JP | H10262256 A * | 8/1998 | | |
| WO | 2010002644 A1 | 1/2010 | | |
| WO | WO-2011019607 A2 * | 2/2011 | ................ | B60P 3/20 |
| WO | 2016147022 A1 | 9/2016 | | |
| WO | WO-2018109514 A1 * | 6/2018 | ......... | B60H 1/00014 |

OTHER PUBLICATIONS

Written Opinion from the International Searching Authority for International Application No. PCT/US2018/049942 International Filing Date: Sep. 7, 2018; dated Jan. 3, 2019; 8 Pages.

* cited by examiner

TRAILER TRANSPORT REFRIGERATION UNIT ASSISTED BY A TRACTOR AUXILIARY POWER UNIT

CROSS-REFERENCE TO RELATED APPLICATIONS

This application is a Non-Provisional Application of PCT/US2018/049942 filed Sep. 7, 2018, which claims the benefit of 62/556,626 filed Sep. 11, 2017, the disclosure of which is incorporated herein by reference in its entirety.

BACKGROUND

The present disclosure relates to a tractor trailer system, and more particularly, to a transport refrigeration unit with power demands assisted by an Auxiliary Power Unit of the tractor.

Traditional tractor trailer systems include a tractor having an Auxiliary Power Unit (APU) adapted to provide power to a number of tractor electrical loads (i.e., hotel devices of the tractor). A trailer or cargo container of the tractor trailer system may include a Transport Refrigeration Unit (TRU) adapted to cool, or otherwise condition, cargo within the trailer. To provide on-demand electrical power, both the APU and the TRU may each include respective combustion engines and associated electrical generators. Traditionally, the APU and the TRU function independently providing electrical power only to their respective loads. Typically, the combustion engine of the TRU is much larger than the combustion engine of the APU reflecting the differences in maximum load demands between the TRU and the APU. Trends in the cargo transport industry continue toward a reduction in transport costs and service calls while reducing environmental impact.

SUMMARY

A Transport Refrigeration Unit (TRU) adapted to mount to a trailer of a tractor trailer system including a tractor having a hotel device and an Auxiliary Power Unit (APU) configured to provide electrical power to the hotel device according to one, non-limiting, embodiment of the present disclosure includes a TRU controller; an electrical TRU component; and a TRU Power Unit, wherein the TRU controller is configured to utilize the APU to provide electrical power to the electrical TRU component during low TRU load conditions, and utilize the TRU Power Unit during high TRU load conditions.

Additionally to the foregoing embodiment, the TRU Power Unit includes a TRU generator and a TRU combustion engine adapted to drive the TRU generator.

In the alternative or additionally thereto, in the foregoing embodiment, the APU includes an APU generator and an APU combustion engine adapted to drive the APU generator.

In the alternative or additionally thereto, in the foregoing embodiment, the APU combustion engine is smaller than the TRU combustion engine.

In the alternative or additionally thereto, in the foregoing embodiment, the APU includes an APU generator and an APU combustion engine adapted to drive the APU generator.

In the alternative or additionally thereto, in the foregoing embodiment, the APU generator is a three phase generator.

In the alternative or additionally thereto, in the foregoing embodiment, the APU includes an APU controller, and the TRU controller is configured to command the APU controller to provide power if the APU has excess power generating capacity and during low TRU load conditions.

In the alternative or additionally thereto, in the foregoing embodiment, the TRU includes a CAN bus link extending between the TRU and APU controllers.

In the alternative or additionally thereto, in the foregoing embodiment, the APU includes an APU battery for starting the APU combustion engine, and the TRU includes a TRU battery for starting the TRU combustion engine, and at least one of the APU controller and the TRU controller is configured to utilize the APU battery to start the TRU combustion engine if the TRU battery is depleted, and is configured to utilize the TRU battery to start the APU combustion engine if the APU battery is depleted.

In the alternative or additionally thereto, in the foregoing embodiment, the TRU includes a three phase power cable extending between the TRU and the APU.

In the alternative or additionally thereto, in the foregoing embodiment, the TRU includes a monitoring module stored in an electronic storage medium of the TRU controller and executed by a processor of the TRU controller, wherein the monitoring module is configured to communicate with the APU to determine real-time load demands of the APU; and a selection module stored in the electronic storage medium and executed by the processor, wherein the selection module is configured to select between the APU and the TRU power unit to provide electrical power to the electrical TRU component based on available power generation capacity of the APU and the load demand of the electrical TRU component.

In the alternative or additionally thereto, in the foregoing embodiment, a maximum load capacity of the APU is programmed into the TRU controller.

In the alternative or additionally thereto, in the foregoing embodiment, the TRU controller includes a telematics system for remote, two-way, wireless communication with at least the TRU.

A method of operating a Transport Refrigeration Unit (TRU) electrically connected to an Auxiliary Power Unit (APU) of a tractor according to another, non-limiting, embodiment includes calling for energization of a TRU component by the TRU controller; comparing a load demand of the TRU component to an available load capacity of the APU by a selection module of the TRU controller; and selecting the APU to provide power to the TRU component by a selection module of the TRU controller and if the available load capacity is greater than the load demand.

Additionally to the foregoing embodiment, the method includes monitoring the current load demands of the APU by a monitoring module of the TRU controller; and sending the current load demands to the selection module.

In the alternative or additionally thereto, in the foregoing embodiment, the TRU controller includes a two-way wireless telematics system.

In the alternative or additionally thereto, in the foregoing embodiment, the APU includes an APU generator driven by an APU combustion engine for providing electrical power to hotel devices of the tractor, and selectively providing electrical power to the TRU.

In the alternative or additionally thereto, in the foregoing embodiment, the TRU includes a TRU generator driven by a TRU combustion engine that is larger than the APU combustion engine.

In the alternative or additionally thereto, in the foregoing embodiment, the TRU combustion engine does not run when the APU is selected by the selection module.

In the alternative or additionally thereto, in the foregoing embodiment, the selection module is configured to select the APU to supplement power for the TRU.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
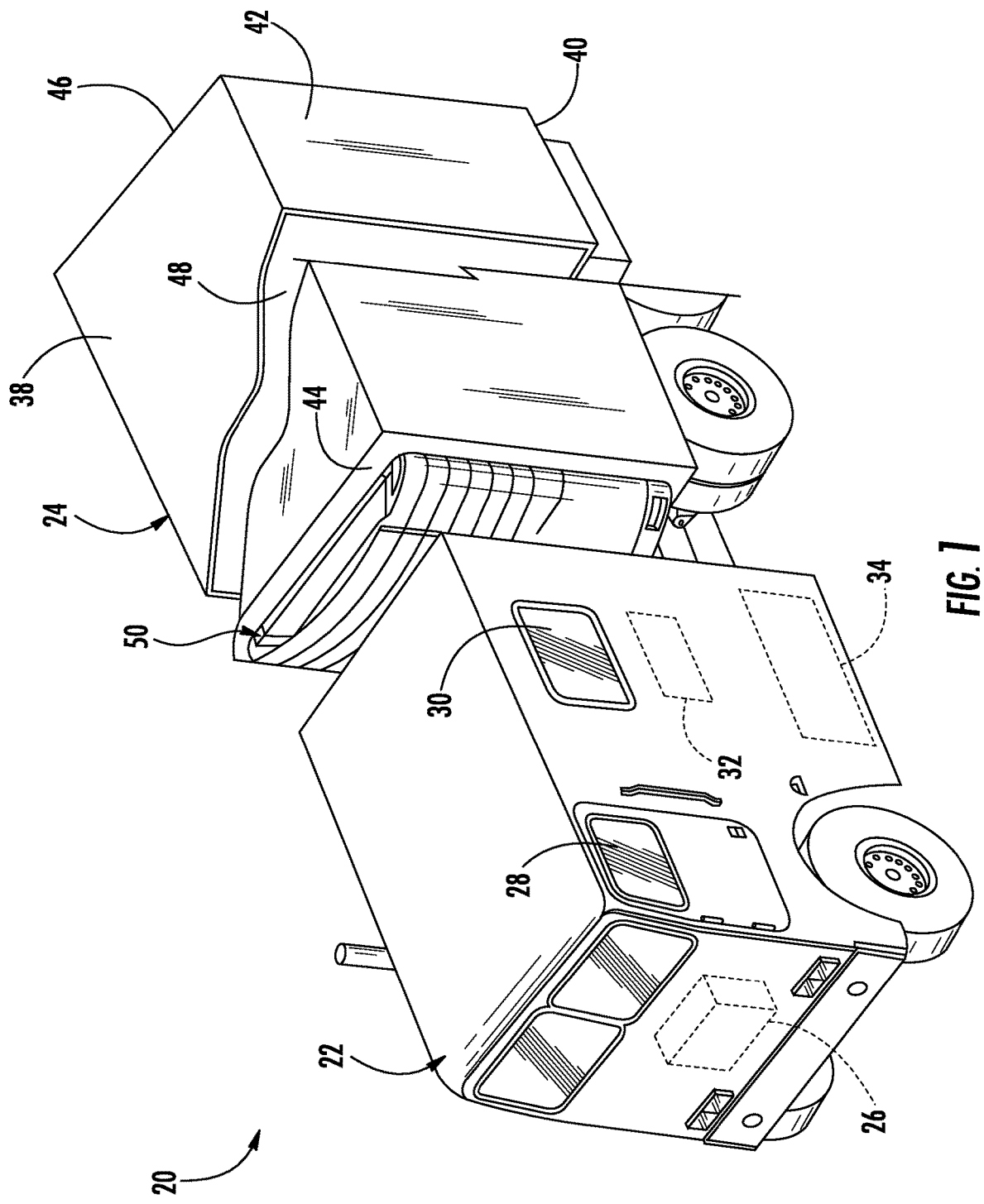
FIG. 1 is a perspective view of a tractor trailer system as one, non-limiting, embodiment of the present disclosure.

Referring to FIG. 1, a tractor trailer system 20 of the present disclosure is illustrated. The tractor trailer system 20 may include a tractor or truck 22, and a trailer 24 that may be detachably connected to the tractor 22. The tractor 22 may include a powertrain 26, a cab 28, a sleeper compartment 30, a plurality of auxiliary loads (i.e., hotel devices) 32, and an Auxiliary Power Unit (APU) 34. The powertrain 26 (i.e., combustion engine) may generally be placed in an engine compartment located under a forward hood (not shown) of the tractor 22, and is adapted to propel the tractor 22 and the connected trailer 24 to a desired destination. The sleeper compartment 30 may be constructed to provide sleeping quarters for an operator of the tractor 22. The APU 34 is adapted to provide electrical power to the plurality of hotel devices 32 upon demand. Examples of hotel devices 32 may include courtesy lights, cooking appliances, heat and/or air conditioning for the sleeper compartment 30, and any other convenience for the operator that may be needed when, for example, the powertrain 26 is shutdown.

The trailer may include a top wall 38, a bottom wall 40 opposed to and space from the top wall 38, two side walls 42 space from and opposed to one-another, and opposing front and rear walls 44, 46 with the front wall 44 being closest to the tractor 22. The trailer 24 may further include doors (not shown) at the rear wall 46, or any other wall. The walls 38, 40, 42, 44, 46 together define the boundaries of a cargo compartment 48. It is contemplated and understood that the cargo compartment 48 may also be divided into two or more smaller compartments for different temperature cargo requirements.

The trailer 24 is generally constructed to store a cargo (not shown) in the compartment 48. A Transport Refrigeration Unit (TRU) 50 of the trailer 24 may be mounted to the front wall 44. The cargo is maintained at a desired temperature by cooling of the compartment 40 via the TRU 50 adapted to circulate air into and through the cargo compartment 48 of the trailer 24. It is further contemplated and understood that the TRU 50 may be applied to any transport container and not necessarily those used in tractor trailer systems. Furthermore, the transport container may be a part of the trailer 24 and constructed to be removed from a framework and wheels (not shown) of the trailer 24 for alternative shipping means (e.g., marine, rail, flight, and others).

Figure 2:
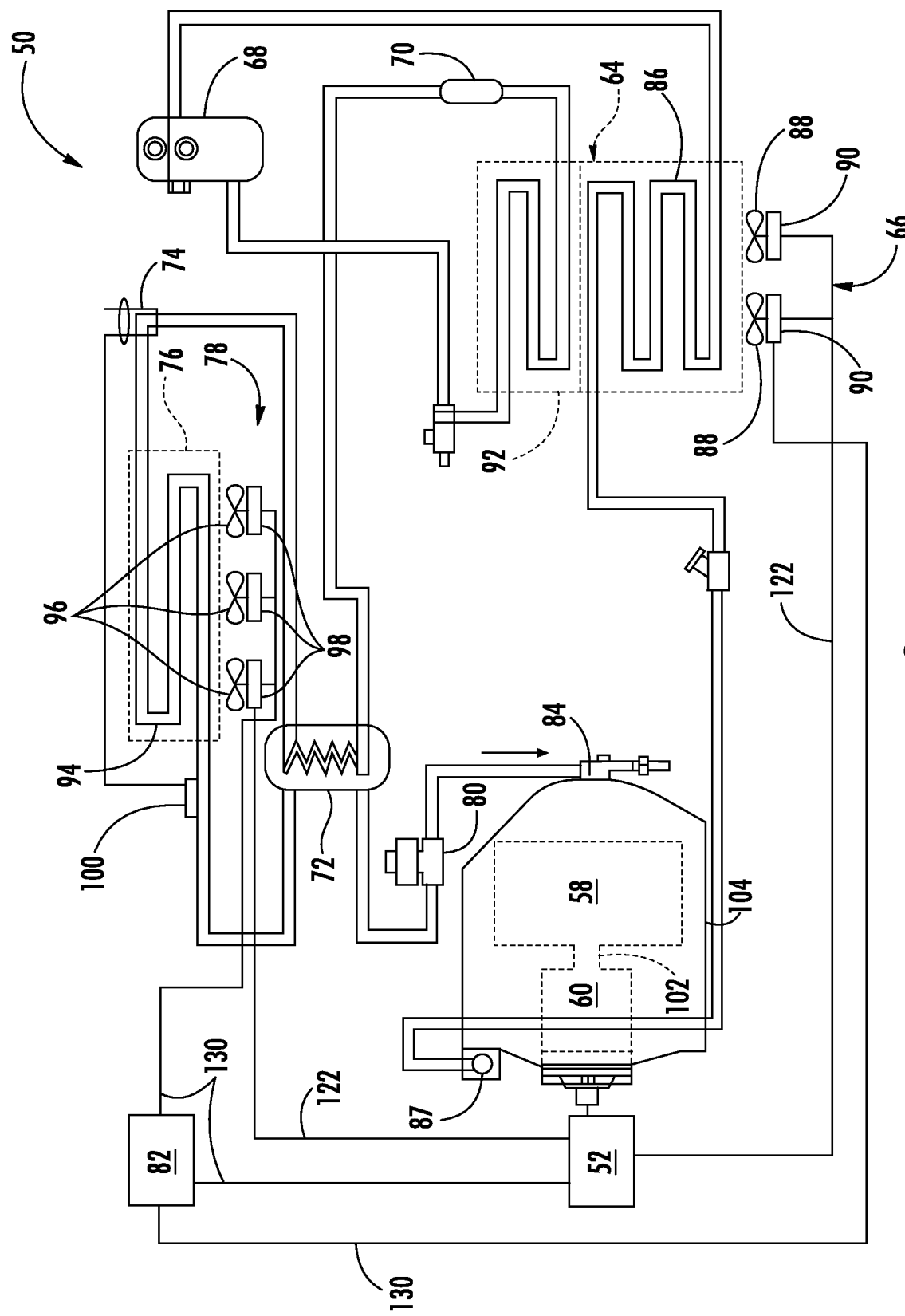
FIG. 2 is a schematic of the transport refrigeration unit of the tractor trailer system.
Figure 4:
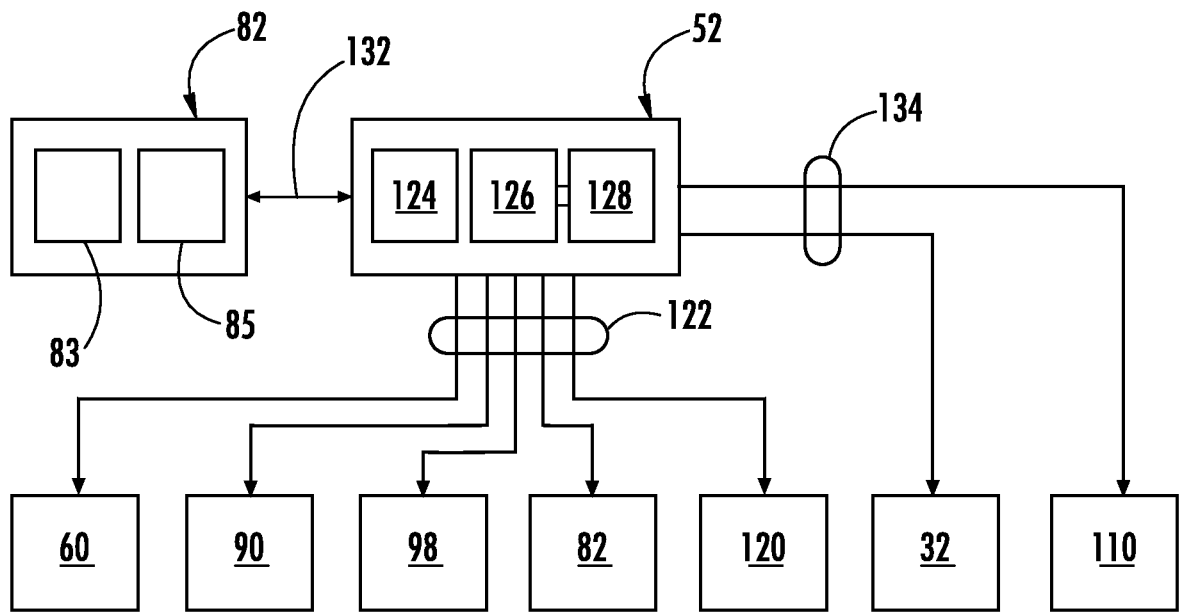
FIG. 4 is a schematic of power distribution and control between the transport refrigeration unit and the auxiliary power unit.

Referring to FIG. 2, the TRU 50 may include a power unit 52, a compressor 58, an electric compressor motor 60, a condenser heat exchanger 64 that may be air cooled, a condenser fan assembly 66, a receiver 68, a filter dryer 70, a heat exchanger 72, a thermostatic expansion valve 74, an evaporator heat exchanger 76, an evaporator fan assembly 78, a suction modulation valve 80, and a controller 82 that may include an electronic processor 83 (e.g., microprocessor) and a computer readable and writeable storage medium 85 (see FIG. 4). Operation of the TRU 50 may best be understood by starting at the compressor 58, where the suction gas (i.e., natural refrigerant) enters the compressor at a suction port 84 and is compressed to a higher temperature and pressure. The refrigerant gas is emitted from the compressor 58 at an outlet port 87 and may then flow into tube(s) 86 of the condenser heat exchanger 64.

Air flowing across a plurality of condenser coil fins (not shown) and the tubes 86, cools the gas to its saturation temperature. The air flow across the condenser heat exchanger 64 may be facilitated by one or more fans 88 of the condenser fan assembly 66. The condenser fans 88 may be driven by respective condenser fan motors 90 of the fan assembly 66 that may be electric.

By removing latent heat, the gas within the tubes 86 condenses to a high pressure and high temperature liquid and flows to the receiver 68 that provides storage for excess liquid refrigerant during low temperature operation. From the receiver 68, the liquid refrigerant may pass through a subcooler heat exchanger 92 of the condenser heat exchanger 64, through the filter-dryer 70 that keeps the refrigerant clean and dry, then to the heat exchanger 72 that increases the refrigerant subcooling, and finally to the thermostatic expansion valve 74.

As the liquid refrigerant passes through the orifices of the expansion valve 74, some of the liquid vaporizes into a gas (i.e., flash gas). Return air from the refrigerated space (i.e., cargo compartment 40) flows over the heat transfer surface of the evaporator heat exchanger 76. As the refrigerant flows through a plurality of tubes 94 of the evaporator heat exchanger 76, the remaining liquid refrigerant absorbs heat from the return air, and in so doing, is vaporized.

The evaporator fan assembly 78 includes one or more evaporator fans 96 that may be driven by respective fan motors 98 that may be electric. The air flow across the evaporator heat exchanger 76 is facilitated by the evaporator fans 96. From the evaporator heat exchanger 76, the refrigerant, in vapor form, may then flow through the suction modulation valve 80, and back to the compressor 58.

A thermostatic expansion valve bulb sensor 100 may be located proximate to an outlet of the evaporator tube 94. The bulb sensor 100 is intended to control the thermostatic expansion valve 74, thereby controlling refrigerant superheat at an outlet of the evaporator tube 94. It is further contemplated and understood that the above generally describes a single stage vapor compression system that may be used for natural refrigerants such as propane and ammonia. Other refrigerant systems may also be applied that use carbon dioxide (CO2) refrigerant, and that may be a two-stage vapor compression system.

The compressor 58 and the compressor motor 60 may be linked via an interconnecting drive shaft 102. The compressor 58, the compressor motor 60 and the drive shaft 102 may all be sealed within a common housing 104. In some embodiments, the compressor motor 60 may be positioned outside of the compressor housing 104, and therefore the interconnecting drive shaft 102 may pass through a shaft seal located in the compressor housing. The compressor 58 may be a single compressor. The single compressor may be a two-stage compressor, a scroll-type compressor or other compressors adapted to compress natural refrigerants. The natural refrigerant may be CO2, propane, ammonia, or any other natural refrigerant that may include a global-warming potential (GWP) of about one (1).

Figure 3:
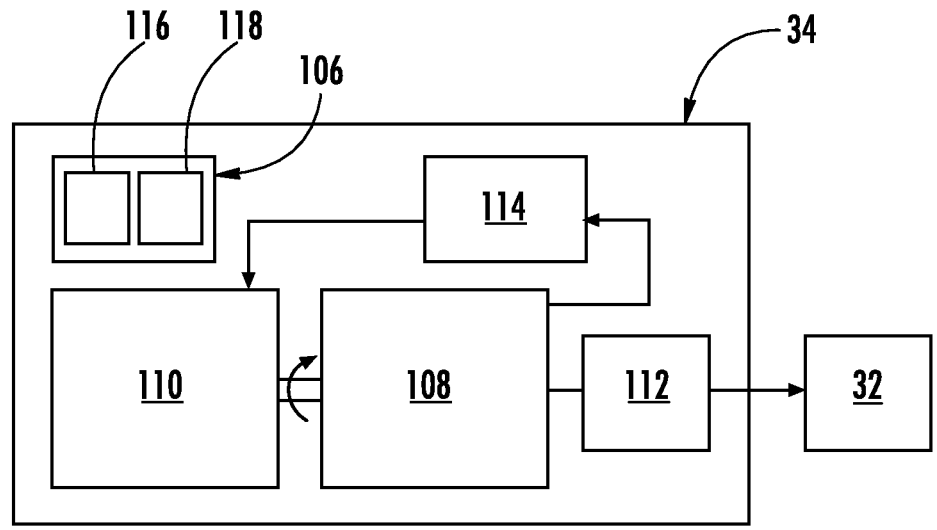
FIG. 3 is a schematic of an auxiliary power unit of the tractor trailer system.

Referring to FIG. 3, the APU 34 may include a controller 106, an electric generator 108, a combustion engine 110 adapted to drive the generator 108, a voltage regulator 112, and a battery 114 configured to provide electric power to start the combustion engine 42 upon command by the controller 106. When the APU 34 is running, the generator 108 may provide the electric power needed to run, or operate, the various hotel devices 32 and charge the battery 114. Because the hotel devices 32 may operate at different voltages, the voltage regulator 112 may be used to reduce or increase voltage as needed. It is further contemplated that the APU 34 may include other electric power conditioning devices as is generally known by one skilled in the art. The APU controller 106 may include a processor 116 that may be computer-based (e.g., microprocessor) and an electronic storage medium 118 that may be computer writeable and readable.

Referring to FIGS. 2 and 4, the power unit 52 of the TRU 50 may be configured to selectively power the compressor motor 60, the condenser fan motors 90, the evaporator fan motors 98, the controller 82, other TRU components 120 (e.g., sensor 100), the hotel devices 32. In one embodiment, if the battery 114 of the APU 34 is depleted, the power unit 52 may be utilized to charge the battery 114 and/or start the combustion engine 110 of the APU 34. The electric power may be transferred over various buses and/or electrical conductors 122.

The power unit 52 may include one or more energy sources. Such energy sources may include an energy storage device 124 (e.g., battery or battery bank) and/or a generator 126 driven by a combustion engine 128 (e.g., diesel engine). It is further contemplated and understood that other examples of the energy sources may include fuel cells, and other devices capable of storing and outputting electric power.

The power management relative to the power unit 52, and controlled power distribution relative to the various power loads, may be configured/arranged to minimize the size of the TRU combustion engine 128 and minimize fossil fuel consumption while still providing enough electric power to meet temperature pulldown demands of the operating TRU 50. The controller 82 through a series of data and command signals over various pathways 130 (see FIG. 2) may, for example, control the electric motors 60, 90, 98 as dictated by the cooling needs of the refrigeration unit 26. The controller 82 may further control the electric power output of the generator 126 and the batteries 124 in order to meet the varying load demands of the TRU 50.

In one example, the TRU generator 126 and the battery or battery bank 124 may be electrically arranged in series. The electric power may be generally distributed through the bus 122, and may be direct current (DC). A converter (not shown) may be arranged at the outlet of the TRU generator 126. The fan motors 90, 98 may be DC motors, and the compressor motor 60 may be an alternating current (AC) motor with an inverter (not shown) at the power input to the motor 60. It is further contemplated and understood that various power conditioning devices may be configured throughout the TRU 50 depending upon the current type and voltage demands of any particular component.

Figure 5:
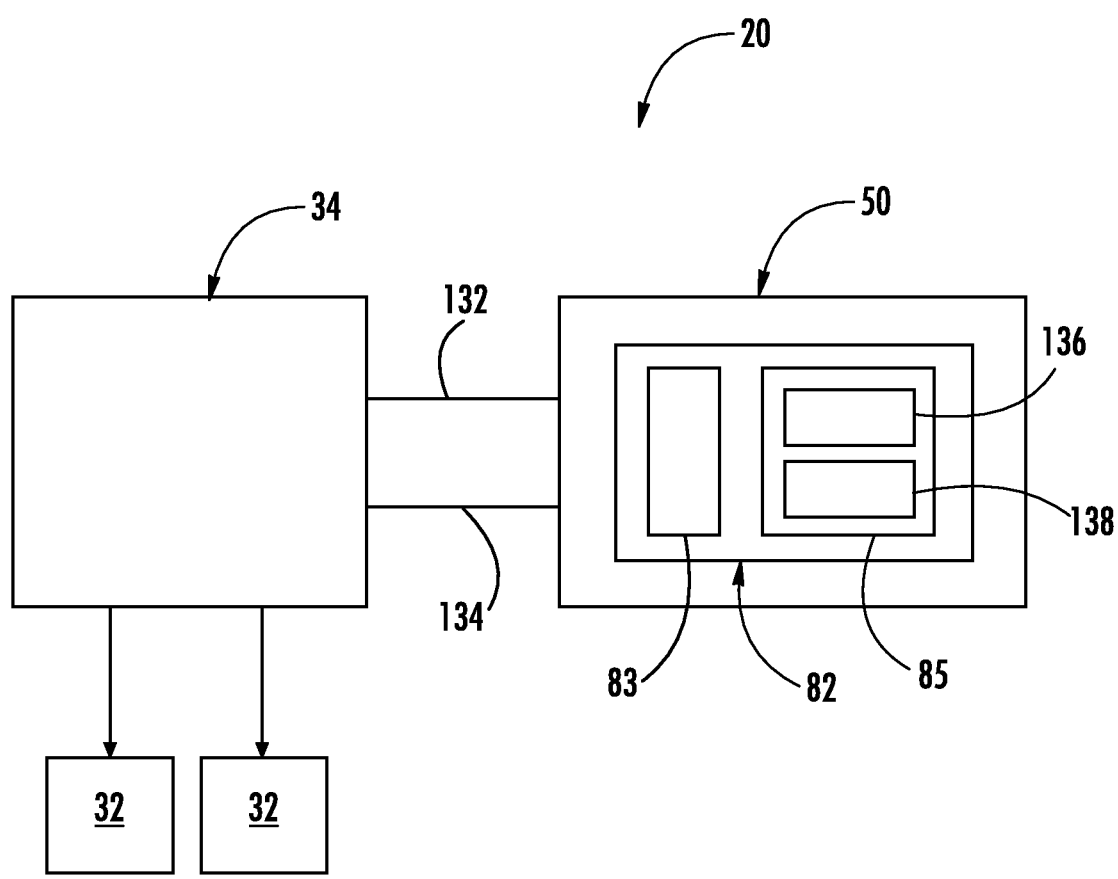
FIG. 5 is a schematic of a communication link between the transport refrigeration unit and the auxiliary power unit.

Referring to FIG. 5, the tractor trailer system 20 may further include a communication and/or control pathway 132 and at least one power conductor or cable 134 (e.g., three phase power cable). The APU controller 106 and the TRU controller 82 may communicate with one another over the pathway 132 that may be wired or wireless. One example of the pathway 132 may be a CAN link or a CAN bus link. In one example, the power conductor 134 may include a bus distribution system.

The TRU controller 82 may further include a monitoring module 136 and a selection module 138. Both modules 136, 138 may be software-based, stored in the storage medium 85 of the TRU controller 82, and executed by the processor 82. During operation of the tractor trailer system 20, the APU 34 may run similar to a typical APU if the TRU 50 is generally not present or operational. If the TRU 50 is operational and connected to the APU 34 (see FIG. 5), a monitoring module 136 (see FIG. 4), which may be software-based and stored in the electronic storage medium 85 and executed by the processor 83 of the TRU controller 82, may be configured to monitor the real-time loads placed on the APU 34. More specifically, via the monitoring module 136, the TRU controller 82 may communicate with the APU controller 106 to determine which hotel devices 32 are presently running thus consuming electrical power. The TRU controller 82 may be preprogrammed to know the full/maximum load capacity of the APU generator 108 and the power needs of each hotel device 32 when operating. Alternatively, the TRU controller 82 may simply determine the present loads placed on the APU generator 108 directly from a sensor (not shown) located on, for example, a power bus of the APU 34.

When the TRU controller 82 determines a need to initiate or energize a particular TRU component (e.g., a defrost cycle, a refrigeration cycle for small cooling demands, and others), the selection module 138 may first determine the available power that the APU generator 108 may produce. That is, the selection module 138 may be preprogrammed knowing the power needs of, for example, a defrost cycle, and knowing the power generation capability of the APU generator 108. The selection module 138 may receive the current load demands/consumption from the monitoring module 136, and may subtract the current load demands of the APU 34 from the power generation capability of the APU generator 108. If the remaining power generation capability of the APU generator 108 exceeds the power consumption needs of the TRU component that the TRU controller 82 want to energize, the TRU controller will select the APU generator 108 to provide the power to drive the TRU component. It is contemplated and understood that if no APU loads are presently placed on the APU generator 108, the TRU controller 82 may simply select the APU generator 108 to power the TRU components if the required power demands does not exceed the capacity of the APU generator.

In another embodiment, the APU 34 and the TRU 50 may also be configured to start each other's respective combustion engines 110, 128 if one had a depleted battery 114, 124. In yet another embodiment, the TRU controller 82 may include a remote, two-way, wireless communication (i.e., telematics) system (not shown) for controlling, at least in-part, the TRU 50. It is contemplated and understood that the telematics system as part of the TRU 50 may also monitor the APU 34.

In one example of operation, the APU may be used to supplement power output of the TRU generator. This may be facilitated by using the APU to run evaporator fans or heater rods. In another example of operation and where the APU operates via APU batteries only, the TRU may be used to charge the APU batteries during low TRU load conditions.

Unlike more traditional APU generators, the APU generator 108 may be a three phase generator similar to the TRU generator 126. Because the combustion engine 110 of the APU 34 may be substantially smaller than the combustion engine 128 of the TRU 50, utilization of the APU generator 108 by the TRU 50 may substantially save in fuel costs, and may further reduce emissions. Other advantages may include quitter running of low load TRU conditions, and less service calls for dead batteries.

While the present disclosure is described with reference to the figures, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A Transport Refrigeration Unit (TRU) adapted to mount to a trailer of a tractor trailer system including a tractor having a hotel device and an Auxiliary Power Unit (APU) configured to provide electrical power to the hotel device, the TRU comprising:
    a TRU controller;
    an electrical TRU component; and
    a TRU Power Unit, wherein the TRU controller is configured to utilize the APU to provide electrical power to the electrical TRU component during low TRU load conditions, and utilize the TRU Power Unit during high TRU load conditions;
    wherein the APU includes an APU controller, and the TRU controller is configured to command the APU controller to provide power if the APU has excess power generating capacity and during low TRU load conditions.

2. The TRU set forth in claim 1, wherein the TRU Power Unit includes a TRU generator and a TRU combustion engine adapted to drive the TRU generator.

3. The TRU set forth in claim 2, wherein the APU includes an APU generator and an APU combustion engine adapted to drive the APU generator.

4. The TRU set forth in claim 3, wherein the APU combustion engine is smaller than the TRU combustion engine.

5. The TRU set forth in claim 1, wherein the APU includes an APU generator and an APU combustion engine adapted to drive the APU generator.

6. The TRU set forth in claim 5, wherein the APU generator is a three phase generator.

7. The TRU set forth in claim 1, further comprising:
    a CAN bus link extending between the TRU and APU controllers.

8. The TRU set forth in claim 1, wherein the APU includes an APU battery for starting the APU combustion engine, and the TRU includes a TRU battery for starting the TRU combustion engine, and at least one of the APU controller and the TRU controller is configured to utilize the APU battery to start the TRU combustion engine if the TRU battery is depleted, and is configured to utilize the TRU battery to start the APU combustion engine if the APU battery is depleted.

9. The TRU set forth in claim 1, further comprising:
    a three phase power cable extending between the TRU and the APU.

10. The TRU set forth in claim 1, further comprising:
    a monitoring module stored in an electronic storage medium of the TRU controller and executed by a processor of the TRU controller, wherein the monitoring module is configured to communicate with the APU to determine real-time load demands of the APU; and
    a selection module stored in the electronic storage medium and executed by the processor, wherein the selection module is configured to select between the APU and the TRU power unit to provide electrical power to the electrical TRU component based on available power generation capacity of the APU and the load demand of the electrical TRU component.

11. The TRU set forth in claim 10, wherein a maximum load capacity of the APU is programmed into the TRU controller.

12. The TRU set forth in claim 1, wherein the TRU controller includes a telematics system for remote, two-way, wireless communication with at least the TRU.

\* \* \* \* \*